(12) United States Patent
Ibe et al.

(10) Patent No.: US 11,299,800 B2
(45) Date of Patent: Apr. 12, 2022

(54) THERMAL SPRAYING MATERTAL (71) Applicant: FUJIMI INCORPORATED, Kiyosu (JP)

(72) Inventors: Hiroyuki Ibe, Kiyosu (JP); Kazuyuki Tsuzuki, Kiyosu (JP)

(73) Assignee: FUJIMI INCORPORATED, Kiyosu (JP)

( * ) Notice: Subject to any disclaimer, the term of this patent is extended or adjusted under 35 U.S.C. 154(b) by 313 days.

(21) Appl. No.: 16/333,908

(22) PCT Filed: Sep. 15, 2017

(86) PCT No.: PCT/JP2017/033522
§ 371 (c)(1),
(2) Date: Mar. 15, 2019

(87) PCT Pub. No.: WO2018/052128
PCT Pub. Date: Mar. 22, 2018

(65) Prior Publication Data
US 2019/0203330 A1    Jul. 4, 2019

(30) Foreign Application Priority Data

Sep. 16, 2016 (JP) .............................. JP2016-181957

(51) Int. Cl.
*C23C 4/04* (2006.01)
*C01F 17/00* (2020.01)
*C01F 17/265* (2020.01)

(52) U.S. Cl.
CPC .............. *C23C 4/04* (2013.01); *C01F 17/265* (2020.01); *C01P 2002/72* (2013.01); *C01P 2004/03* (2013.01); *C01P 2004/32* (2013.01); *C01P 2004/61* (2013.01); *C01P 2004/84* (2013.01); *C01P 2006/11* (2013.01);
(Continued)

(58) Field of Classification Search
None
See application file for complete search history.

(56) References Cited

U.S. PATENT DOCUMENTS

2002/0015853 A1  2/2002  Wataya et al.
2002/0018902 A1  2/2002  Tsukatani et al.
(Continued)

FOREIGN PATENT DOCUMENTS

CN     101312143 A     11/2008
CN     104830341 A      8/2015
(Continued)

OTHER PUBLICATIONS

Office Action issued in corresponding Chinese Patent Application No. 201780056732.4 dated Jun. 15, 2021 with English translation.
(Continued)

*Primary Examiner* — Ronak C Patel
(74) *Attorney, Agent, or Firm* — Foley & Lardner LLP (57) ABSTRACT

Provided is a thermal spraying material capable of forming a thermally sprayed coating film having improved plasma erosion resistance. The invention disclosed here provides a thermal spraying material. This thermal spraying material comprises composite particles in which a plurality of yttrium fluoride microparticles are integrated. In addition, the compressive strength of the composite particles is 5 MPa or more.

7 Claims, 4 Drawing Sheets

20μm (52) U.S. Cl.
CPC ...... *C01P 2006/14* (2013.01); *C01P 2006/21* (2013.01); *C01P 2006/62* (2013.01)

(56) References Cited

U.S. PATENT DOCUMENTS

| | | | |
|---|---|---|---|
| 2002/0177014 | A1 | 11/2002 | Kaneyoshi et al. |
| 2013/0122283 | A1* | 5/2013 | Hamaya ............... C01F 17/206 428/328 |
| 2014/0057078 | A1 | 2/2014 | Hamaya et al. |
| 2016/0244868 | A1* | 8/2016 | Ibe ..................... C04B 35/553 |
| 2017/0189960 | A1 | 7/2017 | Ibe |

FOREIGN PATENT DOCUMENTS

| | | | |
|---|---|---|---|
| JP | 3523216 | B2 | 4/2004 |
| JP | 3523222 | B2 | 4/2004 |
| JP | 3672833 | B2 | 7/2005 |
| JP | 4273292 | B2 | 6/2009 |
| JP | 2015-110844 | A | 6/2015 |
| JP | 5861612 | B2 | 2/2016 |
| JP | 2016-037653 | A | 3/2016 |
| WO | WO-2015/194678 | A1 | 12/2015 |

OTHER PUBLICATIONS

Office Action issued in corresponding Chinese application No. 201780056732.4 dated Nov. 5, 2021 with English translation.
Office Action issued in corresponding Korean application No. 10-2019-7010238 dated Nov. 1, 2021 with English translation.

* cited by examiner

THERMAL SPRAYING MATERIAL

TECHNICAL FIELD

The present invention relates to a thermal spraying material that contains yttrium fluoride.

The present application claims priority on the basis of Japanese Patent Application No. 2016-181957, which was filed on 16 Sep. 2016, and the entire contents of that application are incorporated by reference in the present specification.

BACKGROUND ART

Techniques for imparting new types of functionality by covering base material surfaces with a variety of materials have been used in the past in a variety of fields. For example, thermal spraying methods, in which thermal spraying particles comprising a material such as a ceramic are blown in a softened or molten state onto a base material surface by means of combustion, electrical energy, or the like, so as to form a thermally sprayed coating film comprising the material, are known as one such type of surface covering technique.

In the production of semiconductor devices and the like, semiconductor substrate surfaces are often subjected to micromachining by means of dry etching involving the use of plasma of a halogen-based gas such as fluorine, chlorine or bromine inside a vacuum chamber (container). In addition, the inside of the chamber is cleaned using oxygen plasma after the semiconductor substrate has been removed following the dry etching. On such occasion, members inside the chamber that have been exposed to highly reactive oxygen gas plasma or halogen gas plasma can become eroded. On such occasion, if eroded parts fall as particles from eroded members, the particles become attached to the semiconductor substrate and become foreign bodies that cause circuit defects (hereinafter, these foreign bodies are referred to particles).

In order to reduce the occurrence of particles in the past, members of semiconductor device production apparatuses that were exposed to eroding plasma of oxygen gas, halogen gases, and the like, were provided with ceramic thermally sprayed coating films that were resistant to erosion by plasma (hereinafter referred to as plasma erosion resistance). For example, PTL 1 to 5 indicate that it is possible to form thermally sprayed coating films having high plasma erosion resistance by using a rare earth element-containing compound as a thermal spraying material.

CITATION LIST

Patent Literature

Patent Literature 1: Japanese Patent No. 3523216
Patent Literature 2: Japanese Patent No. 3523222
Patent Literature 3: Japanese Patent No. 4273292
Patent Literature 4: Japanese Patent No. 5861612
Patent Literature 5: Japanese Patent No. 3672833

SUMMARY OF INVENTION

Technical Problem

However, as the degree of integration of semiconductor devices has improved, a need has arisen for stricter controls in terms of preventing contamination by particles. Thermally sprayed coating films provided on semiconductor device production apparatuses also require further improvements in terms of plasma erosion resistance. For example, there is a need to suppress the occurrence of finer particles (e.g., having a particle diameter of 0.2 μm or less), which were allowed in the past.

With these circumstances in mind, the purpose of the present invention is to provide a thermal spraying material capable of forming a thermally sprayed coating film having improved plasma erosion resistance.

Solution to Problem

As mentioned above, it is known that a thermally sprayed coating film having relatively excellent erosion resistance can be formed by using a rare earth element-containing compound as a thermal spraying material. Typical examples of this rare earth element-containing compound include yttrium fluoride ($YF_3$), yttrium oxide ($Y_2O_3$) and yttrium oxyfluorides (YOF and the like). In addition, when thermal spraying is carried out using a conventional thermal spraying material, these rare earth element-containing compounds are oxidized during thermal spraying, which results in rare earth element oxides (typically yttrium oxide) being contained at a relatively high proportion in the obtained thermally sprayed coating film as a matter of course. As a result of diligent research, the inventors of the present invention found that when a rare earth element oxide was contained in a thermally sprayed coating film, parts comprising this rare earth element oxide were a source of ultrafine particles that had been overlooked in the past. In order for a thermally sprayed coating film to be free of rare earth element oxides that are a source of ultrafine particles, it is necessary for the thermal spraying material to not contain a rare earth element oxide and also necessary to use, as the thermal spraying material, a compound that is unlikely to form a rare earth element oxide in a thermal spraying environment. The present invention was completed on the basis of such ideas.

The present invention provides a thermal spraying material having the characteristics described below as a means for solving the problems mentioned above. That is, the thermal spraying material disclosed here contains composite particles formed by a plurality of yttrium fluoride microparticles being integrated. In addition, the composite particles are characterized by having a compressive strength of 5 MPa or more.

Therefore, the thermal spraying material disclosed here is, in general terms, a powder comprising composite particles of yttrium fluoride microparticles. In addition, the plurality of yttrium fluoride microparticles that constitute the composite particles are bound to each other with an extremely high binding strength, as mentioned above. Therefore, it is possible to form a thermally sprayed coating film without the composite particles disintegrating in the period from thermal spraying preparation, through thermal spraying, up to the point where the composite particles are supplied to the base material. As a result, it is possible to suppress oxidation of the thermal spraying material during thermal spraying and form a thermally sprayed coating film while maintaining the yttrium fluoride composition.

Moreover, this compressive strength is a value calculated on the basis of the breaking strength of granulated sintered particles that constitute the thermal spraying material. In the present specification, the compressive strength is taken to be the arithmetic mean of the breaking strength of the particles when 10 or more arbitrary composite particles are selected from a thermal spraying material and measured using an electromagnetic load type compressive strength tester.

Moreover, PTL 1 to 5 disclose powders, which are non-granulated powders (hereinafter, the term "powders", when used solely, refers to non-granulated powders), and granulated powders comprising particles comprising rare earth element-containing compounds as thermal spraying materials. Here, these powders and granulated powders are produced using rare earth element-containing compounds as starting materials. However, production conditions for the thermal spraying materials disclosed in PTL 1, 2 and 5 are oxidizing conditions, and rare earth element oxides that are not explicitly disclosed are inevitably contained in the thermal spraying materials. Moreover, PTL 2 and 4 disclose producing thermal spraying materials under non-oxidizing conditions, but these thermal spraying materials are produced in the form of granulated particles that are granulated by means of weak binding. Therefore, disintegration and oxidation of these granulated particles cannot be avoided during thermal spraying, and an obtained thermally sprayed coating film contains rare earth element oxides. In addition, PTL 3 discloses a thermal spraying material comprising rare earth element-containing compound particles having a polyhedral shape, which is synthesized using a liquid phase method. However, because particles in this thermal spraying material are sharp-cornered polyhedrons, melting properties during thermal spraying and fluidity are low, and it is difficult to form a compact thermally sprayed coating film. Therefore, the thermal spraying material disclosed here can be differentiated from these inventions.

A preferred aspect of the thermal spraying material disclosed here is a powder which comprises a plurality of the composite particles mentioned above and which is characterized in that the bulk density of the powder is 1 to 1.7 g/cm$^3$. Such a bulk density is a high value for composite particles, and the composite particles are in a compact form due to yttrium fluoride microparticles being bound together by means of sintering or the like and the binding progressing sufficiently. Therefore, a thermally sprayed coating film formed using this thermal spraying material can also be more compact. As a result, this thermal spraying material is preferred because the plasma erosion resistance of a thermally sprayed coating film can be further increased. In addition, the thermal spraying material has a high density for composite particles, and can have an appropriate weight. Therefore, this thermal spraying material is also preferred from the perspective of resistance to an air stream being low when the thermal spraying material is blown onto a base material from a thermal spraying device at high speed during thermal spraying.

The bulk density can be a value (initial bulk density) measured in accordance with the fine ceramic powder bulk density measurement method specified in JIS R 1628:1997. In the present specification, bulk density is measured using a constant mass measurement method.

A preferred aspect of the thermal spraying material disclosed here is a powder which comprises a plurality of the composite particles mentioned above and which is characterized in that the average particle diameter of the powder is 10 to 100 μm. Composite particles having this average particle diameter are preferred due to readily melting during thermal spraying and being unlikely to volatilize, thereby enabling a compact thermally sprayed coating film to be formed with good efficiency. In addition, individual composite particles have an appropriate weight, and are therefore also preferred from the perspective of resistance to an air stream being low when the thermal spraying material is blown from a thermal spraying device during thermal spraying.

In the invention disclosed here, the average particle diameter of the thermal spraying material is the $D_{50}$ particle diameter, which corresponds to a cumulative 50% in a volume-based particle size distribution measured using a laser diffraction/light-scattering type particle size distribution measurement apparatus.

A preferred aspect of the thermal spraying material disclosed here is characterized in that no diffraction peak attributable to yttrium oxide is detected in X-Ray diffraction analysis of the powder. That is, this thermal spraying material does not contain yttrium oxide. As a result, when thermal spraying is carried out using this thermal spraying material, it is possible to more reliably prevent yttrium oxide from being contained in a formed thermally sprayed coating film.

A preferred aspect of the thermal spraying material disclosed here is characterized in that if $D_T$ denotes the tap density of the powder and $D_B$ denotes the bulk density of the powder, the bulk reduction R (%), as calculated on the basis of the following formula: $R=(D_T-D_B)/D_T\times 100$, is 30 or more. The apparent density (tap density) of the powder increases if the particles are packed by being tapped. Bulk reduction is an indicator of the degree of packing improvement by tapping. From this bulk reduction, it is possible to evaluate the degree of increase in particle packing by impact from the spatial arrangement of particles in a loose state caused by free falling. In addition, if the bulk reduction is 30% or more, it is possible to assess that supply properties are good when the thermal spraying material is supplied to a thermal spraying device at the time of thermal spraying.

When calculating bulk reduction, the tap density $D_T$ and bulk density $D_B$ can be values for initial bulk density and tap density, which are measured in accordance with the fine ceramic powder bulk density measurement method specified in JIS R 1628:1997. In the present specification, tap density $D_T$ is measured using a constant mass measurement method.

A preferred aspect of the thermal spraying material disclosed here is characterized in that in an electron microscope observation of the composite particles, 40% by number or more of the yttrium fluoride microparticles are bound to and integrated with each other. That is, yttrium fluoride microparticles are integrated with each other directly, not bound by means of a binder such as a resin or metal. Integration is typically carried out by means of sintering. The high compressive strength of the composite particles can be advantageously realized by using this type of constitution.

In a preferred aspect of the thermal spraying material disclosed here, the cumulative pore volume of pores having a pore diameter of 1 μm or less, as determined by means of mercury intrusion porosimetry, is 0.2 cm$^3$/g or less. Composite particles having a high compressive strength can be easily realized by using this type of constitution. Also provided is a thermal spraying material capable of forming a compact thermally sprayed coating film having few pores.

Moreover, in the invention disclosed here, halogen gas plasma is typically plasma generated using a plasma-generating gas that contains a halogen-based gas (a halogen compound gas). Specific examples thereof include fluorine-based gases such as $SF_6$, $CF_4$, $CHF_3$, $ClF_3$ and HF, chlorine-based gases such as $Cl_2$, $BCl_3$ and HCl, and bromine-based gases such as HBr, which are used in dry etching processes and the like when producing semiconductor substrates. It is possible to use one of these gases in isolation, or a mixture of two or more types thereof. In addition, the halogen-based gas may be used as a mixed gas obtained by mixing with an inert gas such as argon (Ar).

DESCRIPTION OF EMBODIMENTS

Preferred embodiments of the present invention will now be explained. Moreover, matters which are essential for carrying out the invention and which are matters other than those explicitly mentioned in the present specification are matters that a person skilled in the art could understand to be matters of design on the basis of the prior art in this technical field. The present invention can be carried out on the basis of the matters disclosed in the present specification and common general technical knowledge in this technical field.

[Thermal Spraying Material]

The thermal spraying material disclosed here is a powder in which a plurality of composite particles have been aggregated. Individual composite particles that constitute the powder are formed when yttrium fluoride microparticles are bound to and integrated with each other. The composite particles as a whole have an approximately spherical shape. In other words, the composite particles have a two-dimensional bound aggregated form in which primary yttrium fluoride microparticles are bound to each other. Here, the yttrium fluoride microparticles also typically have a rounded shape, not a sharp-cornered shape. By having a relatively large particle diameter, the composite particles can give a thermal spraying material which exhibits excellent handleability and high thermally sprayed coating film-forming efficiency. Meanwhile, because the yttrium fluoride microparticles have relatively small particle diameters, the thermal spraying material readily melts during thermal spraying and can form a thermally sprayed coating film having few pores and having good adhesive properties. In addition, the composite particles have a two-dimensionally round shape (as a whole), and can therefore give a thermal spraying material having a higher fluidity than a powder having a relatively small particle diameter.

Yttrium fluoride microparticles may be bound to other yttrium fluoride microparticles by points (extremely small areas) or by relatively large areas. It is preferable for these microparticles to be bound by relatively large areas. Pores may or may not be present between individual yttrium fluoride microparticles. The proportion of pores should be low. In addition, individual yttrium fluoride microparticles may, on the whole, be in the form of independent particles, but a plurality of microparticles may also be integrally bound to each other by a large area so as to constitute a single spherical composite particle. Moreover, when two or more particles are bound by a large area, an outline observed as contrast in an electron microscope observation can be understood to be a boundary between particles. In addition, the term "spherical" used here does not mean only a shape that is geometrically completely spherical, but also encompasses a shape which appears broadly spherical with no conspicuous corners or protrusions (e.g., a ball or a grain).

When a plurality of yttrium fluoride microparticles are bound to and integrated with each other to constitute a composite particle, it is preferable for the composite particle to contain no pores, as mentioned above, in order to make a thermally sprayed coating film formed following thermal spraying more compact and increase plasma erosion resistance. In addition, yttrium fluoride is readily oxidized due to fluorine volatilizing in thermal spraying environments. However, composite particles are preferred from the perspective of volatilization of fluorine being suppressed due to the composite particles being compact. Therefore, when measuring the cumulative pore volume of a powder comprising such composite particles, for example, the cumulative pore volume of pores having a pore diameter of 1 μm or less is preferably 0.2 $cm^3/g$ or less, more preferably 0.16 $cm^3/g$ or less, further preferably 0.12 $cm^3/g$ or less, and particularly preferably 0.1 $cm^3/g$ or less, for example. Moreover, the cumulative pore volume of pores having a pore diameter of 1 μm or less may be 0.05 $cm^3/g$ or less or 0.03 $cm^3/g$ or less. The thermal spraying material disclosed here preferably has a low cumulative pore volume, and the lower limit thereof is not particularly limited. In view of obtaining a balance with ease of production of the thermal spraying material, the cumulative pore volume of pores having a pore diameter of 1 μm or less may be, for example, 0.001 $cm^3/g$ or more.

The cumulative pore volume of this type of thermal spraying material can be calculated on the basis of mercury intrusion porosimetry. Mercury intrusion porosimetry is a method which uses the high surface tension of mercury to determine the pore distribution from the meso region to the macro region from the relationship between the pressure applied in order to cause mercury to penetrate into pores of a powder and the penetrated amount of mercury. Pore distribution measurements based on mercury intrusion porosimetry can be carried out on the basis of, for example, JIS R 1655:2003 (Test methods for pore size distribution of fine ceramic green body by mercury porosimetry). For example, the cumulative pore volume of the thermal spraying material can be measured using a mercury intrusion type porosimeter (a Poresizer 9320 available from Shimadzu Corporation).

The thermal spraying material disclosed here is constituted mainly from yttrium fluoride ($YF_3$), which is a constituent component of the yttrium fluoride microparticles. Here, "constituted mainly from yttrium fluoride" means that 80% by mass or more of the overall thermal spraying material is constituted from yttrium fluoride. Moreover, the proportion of yttrium fluoride is preferably 90% by mass or more, more preferably 95% by mass or more, and particularly preferably 98% by mass or more, and may be, for example 99% by mass or more or 99.5% by mass or more. It is preferable for the proportion of yttrium fluoride to be 99.9% by mass or, for example, substantially 100% by mass. If, for example, no diffraction peak attributable to a compound other than yttrium fluoride is detected in X-Ray diffraction analysis of the thermal spraying material, it can be understood that the proportion of yttrium fluoride is substantially 100% by mass.

Moreover, the thermal spraying material disclosed here may of course contain components other than yttrium fluoride. Components other than yttrium fluoride are preferably compounds having compositions that are unlikely to form oxides when exposed to an oxidizing environment caused by thermal spraying. Preferred examples of such compounds include yttrium oxyfluorides, which are unlikely to immediately form yttrium oxide in an oxidizing atmosphere. Any compound containing yttrium (Y), oxygen (O) and fluorine (F) as constituent elements can be considered as an yttrium oxyfluoride. Specifically, yttrium oxyfluorides can be compounds represented by general formulae such as YOF, $Y_2OF_4$, $Y_5O_4F_7$, $Y_6O_5F_8$, $Y_7O_6F_9$ and $Y_{17}O_{14}F_{23}$. In oxidization, these compounds are not oxidized until a proportion of oxygen atoms to yttrium atoms reaches 1.5 to 1. Therefore, these compounds are preferred from the perspective of not immediately forming yttrium oxide in an oxidizing atmosphere.

Such an yttrium oxyfluoride proportion is not strictly limited, but yttrium oxyfluorides can be contained in the thermal spraying material at a quantity of, for example, 20% by mass or less from the perspective of increasing the yttrium fluoride content. The proportion of yttrium oxyfluorides is, for example, preferably 10% by mass or less, more preferably 5% by mass or less, and particularly preferably 2% by mass or less or 1% by mass or less, for example 0.5% by mass or less. In addition, a preferred aspect can be one in which the thermal spraying material is constituted substantially from only yttrium fluoride and yttrium oxyfluorides. In such cases, it can be understood that no diffraction peak attributable to a compound other than yttrium fluoride and yttrium oxyfluorides is detected when the thermal spraying material is subjected to X-Ray diffraction analysis.

Meanwhile, it is preferable for the thermal spraying material to contain no yttrium oxide, which is a source of ultrafine particles, at the thermal spraying material stage. Therefore, the content of yttrium oxide in the thermal spraying material is preferably 3% by mass or less, and more preferably 1% by mass or less, and it is preferable for the thermal spraying material to contain substantially no yttrium oxide. Therefore, a preferred aspect can be one in which no diffraction peak attributable to yttrium oxide is detected when the thermal spraying material is subjected to X-Ray diffraction analysis.

In the thermal spraying material disclosed here, the composite particles have a compressive strength of 5 MPa or more. This means that yttrium fluoride microparticles in the composite particles are strongly bound to each other with an extremely high binding strength. As a result, disintegration of the composite particles is suppressed when the thermal spraying material is stored, supplied to a thermal spraying apparatus or thermally sprayed. As a result, a thermal spraying material having excellent fluidity and supply properties can be realized. In addition, the proportion of yttrium fluoride microparticles that are inevitably contained as individual microparticles having smaller particle diameters can be reduced. Therefore, it is possible to suppress oxidation and degeneration of the thermal spraying material even in cases where the thermal spraying material is supplied to a high temperature gas jet during thermal spraying. In addition, it is possible to form a thermally sprayed coating film with high efficiency, with the composite particles being inhibited from disintegrating or being repelled from a flame, even in a plasma flame for example.

If the compressive strength of the composite particles is 5 MPa or more, it can be assessed that the yttrium fluoride microparticles are bound sufficiently strongly. The compressive strength of the composite particles is preferably 10 MPa or more, more preferably 20 MPa or more, and particularly preferably 30 MPa or more, and may be, for example, 40 MPa or more or 50 MPa or more. The upper limit for the compressive strength of the composite particles is not particularly limited. For example, it is thought that the compressive strength falls within the range of approximately 70 MPa or less.

Moreover, the average particle diameter of the thermal spraying material described above can be made suitable for the thermal spraying device being used. Typically, the average particle diameter of the thermal spraying material can be approximately 100 µm or less, and is preferably 50 µm or less, and more preferably 40 µm or less, and can be approximately 35 µm or less. The lower limit for the average particle diameter is not strictly controlled, and in cases where the fluidity of the thermal spraying material is to be considered, the average particle diameter can be, for example, 5 µm or more, and is preferably 10 µm or more, and more preferably 15 µm or more, and can be, for example 20 µm or more.

This type of thermal spraying material can be advantageously produced by using an ultrafine yttrium fluoride powder as a raw material, granulating this yttrium fluoride ultrafine powder into a spherical form, and then sintering, but is not necessarily limited to this production method. In ordinary granulated powders, ultrafine particles that are primary particles are simply integrally aggregated using a binder, for example (bound using a binder). Here, relatively large pores are present in gaps between ultrafine particles. When sintered, however, ultrafine particles are directly bound to each other to each other to lower the surface energy. In this way, high compressive strength is attained, as mentioned above. Moreover, the area of binding portions (interfaces) increases and binding strength greatly increases as sintering progresses. In addition, as a result of substance movement, the ultrafine particles are rounded into a more stable spherical form. At the same time, pores present inside the granulated powder are discharged, and the powder becomes more compact. In addition, as this type of sintering progresses, the ultrafine particles used as the raw material undergo grain growth and become coarser. For example, a plurality of ultrafine particles may integrate and form a single granular form. In such cases, it is understood that coarsened ultrafine particles are yttrium fluoride microparticles that constitute the thermal spraying material.

The granulation method is not particularly limited, and a variety of publicly known granulation methods can be used. Specifically, it is possible to use one or more methods such as oscillating granulation methods, fluidized bed granulation methods, agitation granulation methods, compression granulation methods, extrusion granulation methods, fragmentation granulation methods and spray drying methods. A spray drying method is preferred. When sintering, it is preferable to suppress sintering between particles of the granulated powder. When firing the granulated powder, an ordinary batch type kiln or continuous type kiln can be used without particular limitation.

Firing conditions for the sintering are not particularly restricted as long as the composition of the yttrium fluoride does not change when sintering has progressed sufficiently. A rough guide for firing conditions can be, for example, heating at a temperature of not lower than 900° C. but lower than the melting point (for example, lower than 1200° C.) in an inert atmosphere. If the firing temperature is too low, sintering does not progress sufficiently and it is not possible to achieve the compressive strength mentioned above. If the firing temperature is too high, the yttrium fluoride volatilizes and production efficiency decreases, which is not desirable. Moreover, yttrium fluoride has a melting point of approximately 1387° C., but because the particle diameter of the raw material yttrium fluoride powder being used is substantially small, the melting point thereof can be approximately 1200° C. The firing atmosphere can be, for example, an inert atmosphere or a vacuum atmosphere so that the composition of the yttrium fluoride does not change. In such cases, an inert atmosphere is an oxygen-free atmosphere, and can be a noble gas atmosphere, such as argon (Ar) or neon (Ne), or a non-oxidizing atmosphere such as nitrogen ($N_2$). Moreover, in cases where a batch type kiln is used, the atmosphere inside the kiln should be, for example, a non-oxidizing atmosphere. In addition, in cases where a continuous type kiln is used, sintering should be carried out after introducing a non-oxidizing gas stream into the region of the kiln in which heating is carried out (the region in which sintering progresses). When producing the thermal spraying material disclosed here, sintering in an atmospheric atmosphere should be avoided because it would not be possible to avoid oxidation of the yttrium fluoride.

Moreover, the thermal spraying material described above may be modified in a variety of ways as long as the purpose of the invention is not impaired. For example, the thermal spraying material is constituted mainly from yttrium fluoride, but some of the yttrium in the yttrium fluoride may be substituted with other rare earth elements. These rare earth elements are not particularly limited, and can be selected, as appropriate, from among scandium and lanthanoid elements. Specifically, scandium (Sc), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb) and lutetium (Lu) can be considered. From perspectives such as improving plasma erosion resistance and cost, La, Gd, Tb, Eu, Yb, Dy, Ce, and the like, can be advantageously used. It is possible to incorporate one of these rare earth elements in isolation or a combination of two or more types thereof.

Similarly, the thermal spraying material is constituted mainly from yttrium fluoride, but some of the fluorine in the yttrium fluoride may be substituted with other halogen elements. These halogen elements are not particularly limited, and may be any element belonging to group 17 of the periodic table of the elements. Specifically, it is possible to use any one of halogen atoms such as chlorine (Cl), bromine (Br), iodine (I) and astatine (At) in isolation, or a combination of two or more thereof. F, Cl and Br are preferred.

[Thermally Sprayed Coating Film-Equipped Member]

By thermally spraying a base material with the thermal spraying material described above, it is possible to form a thermally sprayed coating film on a surface of the base material. A thermally sprayed coating film-equipped member is provided by providing this thermally sprayed coating film on the surface of the base material.

[Base Material]

In the thermally sprayed coating film-equipped member disclosed here, the base material on which the thermally sprayed coating film is formed is not particularly limited. For example, the material, form, and the like, of the base material are not particularly limited as long as the base material comprises a material having the desired resistance to thermal spraying of a thermal spraying material. Examples of materials that constitute the base material include a variety of metallic materials, such as metals, metalloids and alloys of these, and a variety of inorganic materials. Specifically, examples of metallic materials include metallic materials including aluminum, aluminum alloys, iron, steel, copper, copper alloys, nickel, nickel alloys, gold, silver, bismuth, manganese, zinc and zinc alloys; and metalloid materials including group IV semiconductors such as silicon (Si) and germanium (Ge), group II-VI compound semiconductors such as zinc selenide (ZnSe), cadmium sulfide (CdS) and zinc oxide (ZnO), group III-V compound semiconductors such as gallium arsenide (GaAs), indium phosphide (InP) and gallium nitride (GaN), group IV compound semiconductors such as silicon carbide (SiC) and silicon-germanium (SiGe), and chalcopyrite type semiconductors such as Copper Indium Selenium ($CuInSe_2$). Examples of inorganic materials include calcium fluoride (CaF), quartz ($SiO_2$) substrate materials, oxide ceramics such as alumina ($Al_2O_3$) and zirconia ($ZrO_2$), nitride ceramics such as silicon nitride ($Si_3N_4$), boron nitride (BN) and titanium nitride (TiN), and carbide ceramics such as silicon carbide (SiC) and tungsten carbide (WC). It is possible to use one of these materials to constitute the base material or constitute a base material by complexing two or more of these. Of these, types of steel such as a variety of SUS materials (so-called stainless steels), which have relatively high coefficients of thermal expansion among commonly used metallic materials, heat-resistant alloys such as Inconel, low expansion alloys such as Invar and Kovar, corrosion-resistant alloys such as Hastelloy, and aluminum alloys represented by 1000 series to 7000 series aluminum alloys that are useful as light weight structural materials can be given as preferred examples of the base material. Such base materials can be, for example, members that constitute semiconductor device production apparatuses and members that are exposed to highly reactive oxygen gas plasma or halogen gas plasma. For example, silicon carbide (SiC) and the like can be classified into different categories as a compound semiconductor, an inorganic material, or the like, according to convenience such as intended use, but can be the same material.

[Method for Forming Thermally Sprayed Coating Film]

Moreover, the thermally sprayed coating film mentioned above can be formed by supplying the thermal spraying material disclosed here to a thermal spraying apparatus on the basis of a publicly known thermal spraying method. That is, a thermally sprayed coating film comprising this material is formed by blowing a powdered thermal spraying material in a softened or molten state by means of a heat source such as combustion or electrical energy. The method for thermally spraying this thermal spraying material is not particularly limited. For example, thermal spraying methods such as plasma spraying methods, high velocity flame spraying methods, flame spraying methods, detonation flame spraying methods and aerosol deposition methods can be advantageously used. Characteristics of the thermally sprayed coating film may depend to a certain extent on the thermal spraying method and thermal spraying conditions. However, regardless of the thermal spraying method and thermal spraying conditions, by using the thermal spraying material disclosed here, it is possible to form a thermally sprayed coating film having improved plasma erosion resistance compared to cases in which other thermal spraying materials are used.

A plasma spraying method is a thermal spraying method in which a plasma flame is used as a thermal spraying heat source for softening or melting a thermal spraying material. An arc is generated between electrodes, and when a working gas is plasmafied by the arc, the plasma stream is ejected as a high temperature high speed plasma jet from a nozzle. Plasma spraying methods encompass coating methods in which a thermally sprayed coating film is obtained by introducing a thermal spraying material into this plasma jet and heating and accelerating the thermal spraying material so as to deposit the thermal spraying material on a base material. Moreover, plasma spraying methods can be types such as atmospheric plasma spraying (APS) that is carried out in air, low pressure plasma spraying (LPS), in which thermal spraying is carried out at a lower pressure than atmospheric pressure, and high pressure plasma spraying, in which plasma spraying is carried out in a pressurized container at a higher pressure than atmospheric pressure. For example, when this type of plasma spraying is used, a thermal spraying material is melted and accelerated by a plasma jet at a temperature of approximately 5000° C. to 10,000° C., thereby enabling the thermal spraying material to impact on a base material at a speed of approximately 300 to 600 m/s and accumulate on the base material.

In addition, high velocity oxygen fuel (HVOF) flame spraying methods, warm spraying methods, high velocity air fuel (HVAF) flame spraying methods, and the like, can be considered as high velocity flame spraying methods.

A HVOF spraying method is a type of flame spraying method in which a fuel and oxygen are mixed and combusted under high pressure to produce a combustion flame, and the combustion flame is used as a heat source for thermal spraying. By increasing the pressure in a combustion chamber, a high speed (possibly supersonic) high temperature gas stream is ejected from a nozzle while maintaining a continuous combustion flame. HVOF thermal spraying methods encompass coating methods in which a thermally sprayed coating film is obtained by introducing a thermal spraying material into this gas stream and heating and accelerating the thermal spraying material so as to deposit the thermal spraying material on a base material. For example, when a HVOF thermal spraying method is used, a thermal spraying material is supplied to a supersonic combustion flame jet at a temperature of 2000° C. to 3000° C., thereby softening or melting the thermal spraying material and enabling the thermal spraying material to impact on a base material at a high speed of 500 to 1000 m/s and accumulate on the base material. The fuel used in high velocity flame spraying may be a hydrocarbon gas fuel such as acetylene, ethylene, propane or propylene, or a liquid fuel such as kerosene or ethanol. In addition, the temperature of the supersonic combustion flame increases as the melting point of the thermal spraying material increases, and from this perspective, use of a gas fuel is preferred.

In addition, it is possible to use a thermal spraying method known as a warm thermal spraying method, which corresponds to the HVOF thermal spraying method described above. Typically, a warm thermal spraying method is a method in which a thermally sprayed coating film is formed by thermally spraying in a state whereby the temperature of the combustion flame in the HVOF thermal spraying method described above is lowered by mixing a cold gas comprising nitrogen or the like at a temperature close to room temperature with the combustion flame. The state of thermal spraying material is not limited to a completely molten state, and it is possible to thermally spray the thermal spraying material in a partially molten state or in a softened state at a temperature that is not higher than the melting point of the thermal spraying material. For example, when this warm thermal spraying method is used, a thermal spraying material is supplied to a supersonic combustion flame jet at a temperature of 1000° C. to 2000° C., thereby softening or melting the thermal spraying material and enabling the thermal spraying material to impact on a base material at a high speed of 500 to 1000 m/s and accumulate on the base material.

A HVAF thermal spraying method is a thermal spraying method in which air is used instead of oxygen as the combustion gas in the HVOF thermal spraying method described above. When a HVAF thermal spraying method is used, the thermal spraying temperature can be lower than in a HVOF thermal spraying method. For example, by supplying a thermal spraying material to a supersonic combustion flame jet at a temperature of 1600° C. to 2000° C., the thermal spraying material softens or melts, thereby enabling thermal spraying particles to impact on a base material at a high speed of 500 to 1000 m/s and accumulate on the base material.

[Thermally Sprayed Coating Film]

The thermally sprayed coating film disclosed here is formed by thermally spraying the thermal spraying material described above onto a surface of an arbitrary base material. Oxidation of the thermal spraying material described above during thermal spraying is suppressed. Therefore, the thermally sprayed coating film is constituted as a coating film comprising yttrium fluoride ($YF_3$) as the primary component. Here, "primary component" means that among the constituent components that constitute the thermally sprayed coating film, yttrium fluoride accounts for 70% by mass or more of the thermally sprayed coating film, preferably 80% by mass or more, and more preferably 90% by mass or more, for example 95% by mass or more. Yttrium fluoride may account for, for example, 98% by mass or more or 99% by mass or more.

Moreover, even in cases where the material disclosed here is used, yttrium oxyfluorides may be contained in addition to yttrium fluoride in the thermally sprayed coating film if thermal spraying is carried out under ordinary thermal spraying conditions. For example, the proportion of yttrium fluoride can be reduced and the proportion of yttrium oxyfluorides can be increased in comparison with the thermal spraying material used in the thermal spraying. These yttrium oxyfluorides may include substances having a variety of compositions, such as the general formulae YOF and $Y_5O_4F_7$. The proportion of these yttrium oxyfluorides is not particularly limited, but is preferably a proportion of 30% by mass or less in the thermally sprayed coating film. The proportion of yttrium oxyfluorides is more preferably 20% by mass or less, and particularly preferably 10% by mass or less. In addition, a preferred aspect of the thermally sprayed coating film, like the thermal spraying material, can be one in which the thermally sprayed coating film is constituted substantially from only yttrium fluoride and yttrium oxyfluorides. In such cases, it can be understood that no diffraction peak attributable to a compound other than yttrium fluoride and yttrium oxyfluorides is detected when the thermally sprayed coating film is subjected to X-Ray diffraction analysis.

Meanwhile, it is possible for the thermally sprayed coating film to contain no yttrium oxide, which is a direct source of ultrafine particles. Rare earth element oxides such as yttrium oxide have the characteristic of being relatively hard, but brittle. Therefore, when exposed to a plasma environment caused by dry etching or the like, a part of this yttrium oxide detaches and generates ultrafine particles. In addition, if the thermally sprayed coating film contains yttrium oxide, yttrium oxide parts may be preferentially eroded when exposed to halogen gas plasma. Therefore, the content of yttrium oxide is preferably 3% by mass or less, and more preferably 1% by mass or less, of the thermally sprayed coating film and it is preferable for the thermally sprayed coating film to contain substantially no yttrium oxide. For example, it is preferable for no diffraction peak attributable to yttrium oxide to be detected when the thermally sprayed coating film is subjected to X-Ray diffraction analysis.

Therefore, by carrying out thermal spraying using the thermal spraying material disclosed here, it is not possible to prevent a certain degree of oxidation of yttrium fluoride in the thermal spraying material, but yttrium fluoride is preferentially transformed into yttrium oxyfluorides, not yttrium oxide. This may be an occurrence that is unlikely to be seen in thermally sprayed coating films formed using yttrium oxide-containing thermal spraying materials. Therefore, if the thermally sprayed coating film does not contain yttrium oxide, the occurrence of particles can be suppressed in cases where exposure to halogen gas plasma occurs. Therefore, this thermally sprayed coating film may exhibit plasma erosion resistance, and especially excellent resistance to erosion by halogen-based plasma.

Moreover, because the thermally sprayed coating film is obtained using a thermal spraying material comprising composite particles, the thermal spraying material is sufficiently melted/softened during thermal spraying and a compact thermally sprayed coating film is formed on a base material. The porosity of this thermally sprayed coating film is less than approximately 4%. If the porosity of the thermally sprayed coating film is less than 4%, the texture of the thermally sprayed coating film is compact, the area exposed to plasma is reduced, and plasma erosion resistance can be significantly increased. The porosity of the thermally sprayed coating film may be 3.5% or less or 3% or less. Alternatively, the porosity may be, for example, 1% or less.

Moreover, a low degree of particle occurrence is required in dry etching apparatuses used for producing semiconductor devices. Causes of particle occurrence include detachment of reaction products attached to the inside of a vacuum chamber and chamber degradation caused by use of halogen gas plasma and oxygen gas plasma. Particles become more of a problem as the particle size thereof increases, and as precision processing has become more precise in recent years, a need has arisen to strictly control the occurrence of particles having sizes of 0.2 µm or less (less than 0.2 µm, for example 0.1 µm or less). Occurrence of particles having sizes of 0.2 µm or more could occur in conventional thermally sprayed coating films, but by carrying out suitable thermal spraying using the thermal spraying material disclosed here, it is possible to obtain a thermally sprayed coating film having excellent plasma erosion resistance. Typically, a degenerated layer that is a cause of coarse particles having sizes of approximately 0.2 µm or more in current dry etching environments is not formed in the thermally sprayed coating film disclosed here. In cases where the thermally sprayed coating film disclosed here is eroded in a dry etching environment so as to generate particles, these particles are constituted from a degenerated layer of particles having sizes of approximately 0.2 µm or less (typically 0.1 µm or less). In addition, because formation of a degenerated layer is suppressed in the thermally sprayed coating film disclosed here, the occurrence of ultrafine particles having sizes of approximately 0.2 µm or less (for example, 0.1 µm or less, typically 0.06 µm or less, preferably 19 nm or less, more preferably 5 nm or less, and most preferably 1 nm or less) is suppressed. For example, the number of such particles generated can be reduced to substantially zero.

Moreover, the plasma erosion resistance of this type of thermally sprayed coating film can be evaluated by, for example, measuring the erosion rate, which indicates the degree to which the thermally sprayed coating film has been eroded, when the thermally sprayed coating film (or thermally sprayed coating film-equipped member) is exposed to a prescribed plasma environment. The method for evaluating plasma erosion resistance by means of erosion rate is explained in detail in the working examples given below.

Several working examples relating to the present invention will now be explained, but the present invention is in no way limited to these working examples.

[Production of Thermal Spraying Material]

Example 1

A thermal spraying material of Example 1 was produced by using an yttrium fluoride powder having an average particle diameter of 3 µm as a raw material, dispersing this raw material in a dispersion medium together with a resin binder, granulating by means of a spray drying method, and then firing. Moreover, when the thermal spraying material of Example 1 was produced, a granular powder was first prepared by spraying the raw material dispersion liquid into a gas stream using a spray dryer so as to evaporate the dispersion medium from sprayed liquid droplets. The granular powder was then introduced into a multi-atmosphere furnace and fired under prescribed firing conditions. As shown in Table 1 below, the firing conditions were an Ar atmosphere as the firing atmosphere, a firing temperature of 700° C., and a firing time of approximately 5 minutes.

Example 2

A thermal spraying material of Example 2 was obtained in the same way as in Example 1, except that an yttrium fluoride powder having an average particle diameter of 0.1 µm was used as the raw material and the firing temperature was 900° C.

Example 3

A thermal spraying material of Example 3 was obtained in the same way as in Example 1, except that the firing temperature was 900° C. and the liquid droplet size was increased. Moreover, the size of the liquid droplets in the spray drying can be adjusted as appropriate by, for example, altering the shape of the disk or the speed of rotation in cases where a rotary atomizer type spray dryer is used. The same applies hereinafter.

Example 4

A thermal spraying material of Example 4 was obtained in the same way as in Example 1, except that an yttrium fluoride powder having an average particle diameter of 5 µm was used as the raw material, the liquid droplet size was increased, and the firing temperature was 900° C.

Example 5

A thermal spraying material of Example 5 was obtained in the same way as in Example 1, except that an yttrium fluoride powder having an average particle diameter of 0.1 µm was used as the raw material, the liquid droplet size was reduced, and the firing temperature was 1000° C.

Example 6

A thermal spraying material of Example 6 was obtained in the same way as in Example 1, except that an yttrium fluoride powder having an average particle diameter of 5 μm was used as the raw material, the firing temperature was 1100° C., and the liquid droplet size was increased.

Example 7

A thermal spraying material of Example 7 was obtained in the same way as in Example 1, except that the liquid droplet size was increased, the firing atmosphere was a $N_2$ atmosphere, and the firing temperature was 1100° C.

Example 8

A thermal spraying material of Example 8 was obtained in the same way as in Example 1, except that the liquid droplet size was increased, the firing atmosphere was a vacuum atmosphere, and the firing temperature was 1100° C.

Example 9

A thermal spraying material of Example 9 was obtained in the same way as in Example 1, except that the liquid droplet size was increased, the firing atmosphere was a vacuum atmosphere, and the firing temperature was 400° C.

Example 10

A thermal spraying material of Example 10 was obtained in the same way as in Example 1, except that an yttrium fluoride powder having an average particle diameter of 30 μm was used as the raw material, the firing atmosphere was a vacuum atmosphere, and the firing temperature was 400° C.

Example 11

A thermal spraying material of Example 11 was obtained in the same way as in Example 1, except that the liquid droplet size was increased, the firing atmosphere was an air atmosphere, and the firing temperature was 500° C.

Example 12

A thermal spraying material of Example 12 was obtained in the same way as in Example 1, except that an yttrium fluoride powder having an average particle diameter of 5 μm was used as the raw material, the liquid droplet size was increased, the firing atmosphere was an atmospheric atmosphere, and the firing temperature was 100° C.

Example 13

A thermal spraying material of Example 13 was obtained in the same way as in Example 1, except that the liquid droplet size was increased, the firing atmosphere was an atmospheric atmosphere, and the firing temperature was 800° C.

Example 14

A thermal spraying material of Example 14 was obtained in the same way as in Example 1, except that the liquid droplet size was increased, the firing atmosphere was an atmospheric atmosphere, and the firing temperature was 900° C. Moreover, firing a granular powder in an atmospheric atmosphere at a temperature of 900° C. are firing conditions that were commonly used in the past.

Example 15

A thermal spraying material of Example 15 was obtained in the same way as in Example 1, except that an yttrium fluoride powder having an average particle diameter of 0.1 μm was used as the raw material, the liquid droplet size was increased, the firing atmosphere was an atmospheric atmosphere, and the firing temperature was 1000° C.

Figure 1:
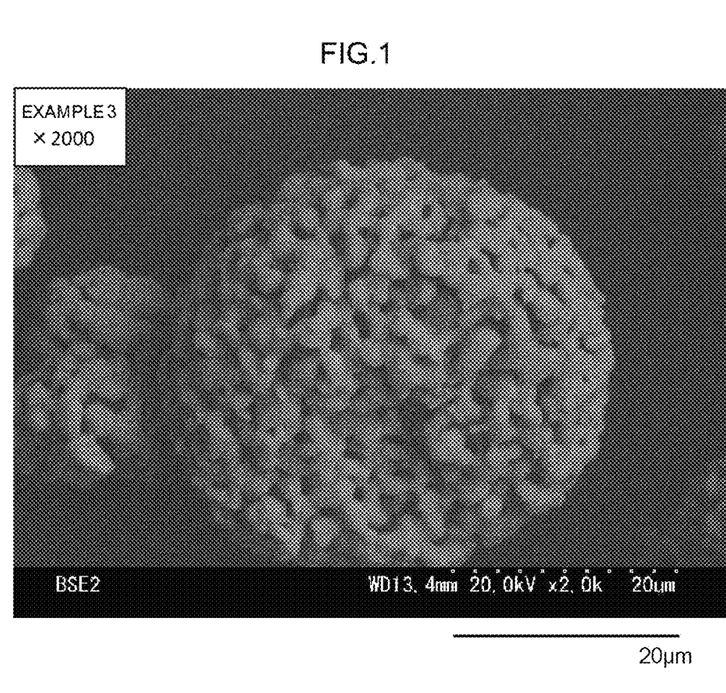
FIG. 1 is a SEM image showing a composite particle in the thermal spraying material of Example 3, which is a working example.
Figure 2:
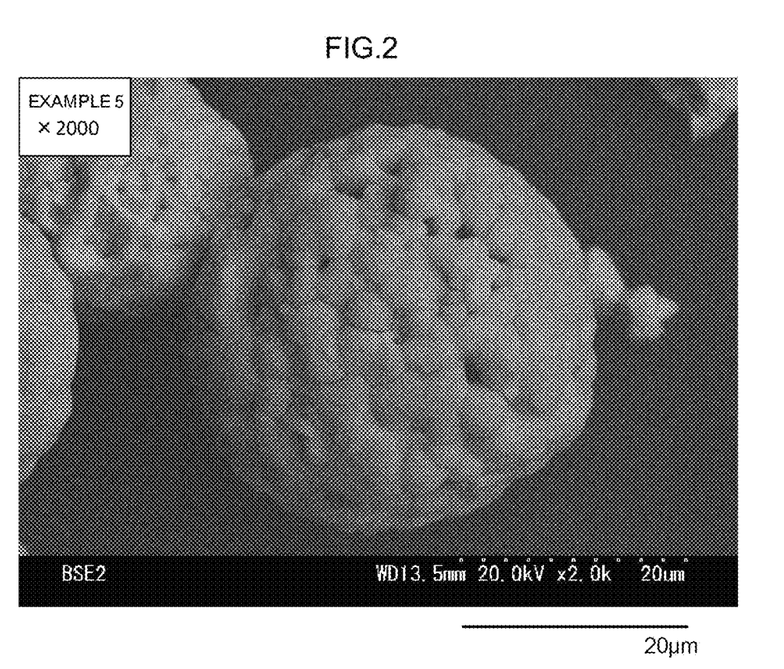
FIG. 2 is a SEM image showing a composite particle in the thermal spraying material of Example 5, which is a working example.
Figure 3:
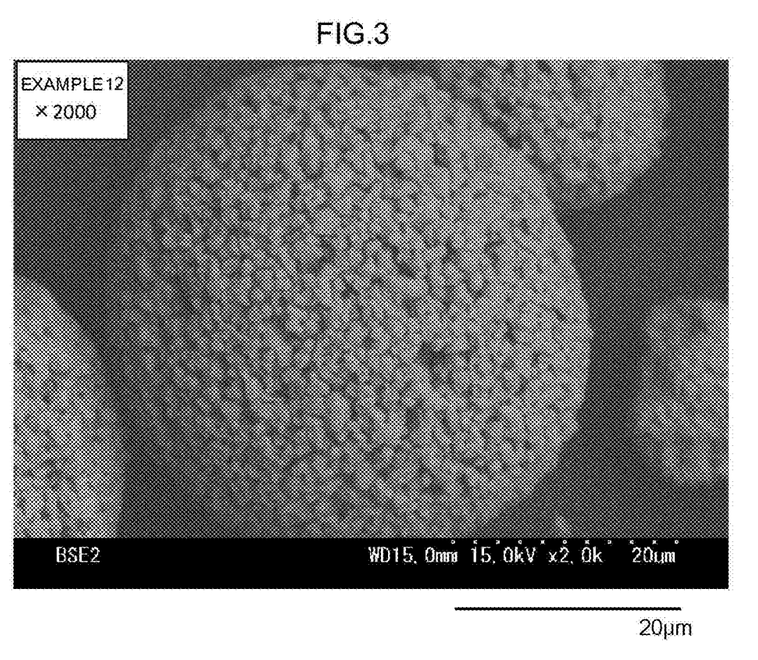
FIG. 3 is a SEM image showing a composite particle in the thermal spraying material of Example 12, which is a comparative example.

The thus obtained thermal spraying materials of Examples 1 to 15 were investigated in terms of composition, average particle diameter, compressive strength, bulk density, tap density and bulk reduction, as shown below, and these results are shown in Table 1. Moreover, the fine structure of composite particles in the thermal spraying materials was observed using a scanning electron microscope (SEM). For reference purposes, observations of the thermal spraying materials of Examples 3, 5 and 12 are shown in FIGS. 1 to 3.

(Composition)

Figure 4:
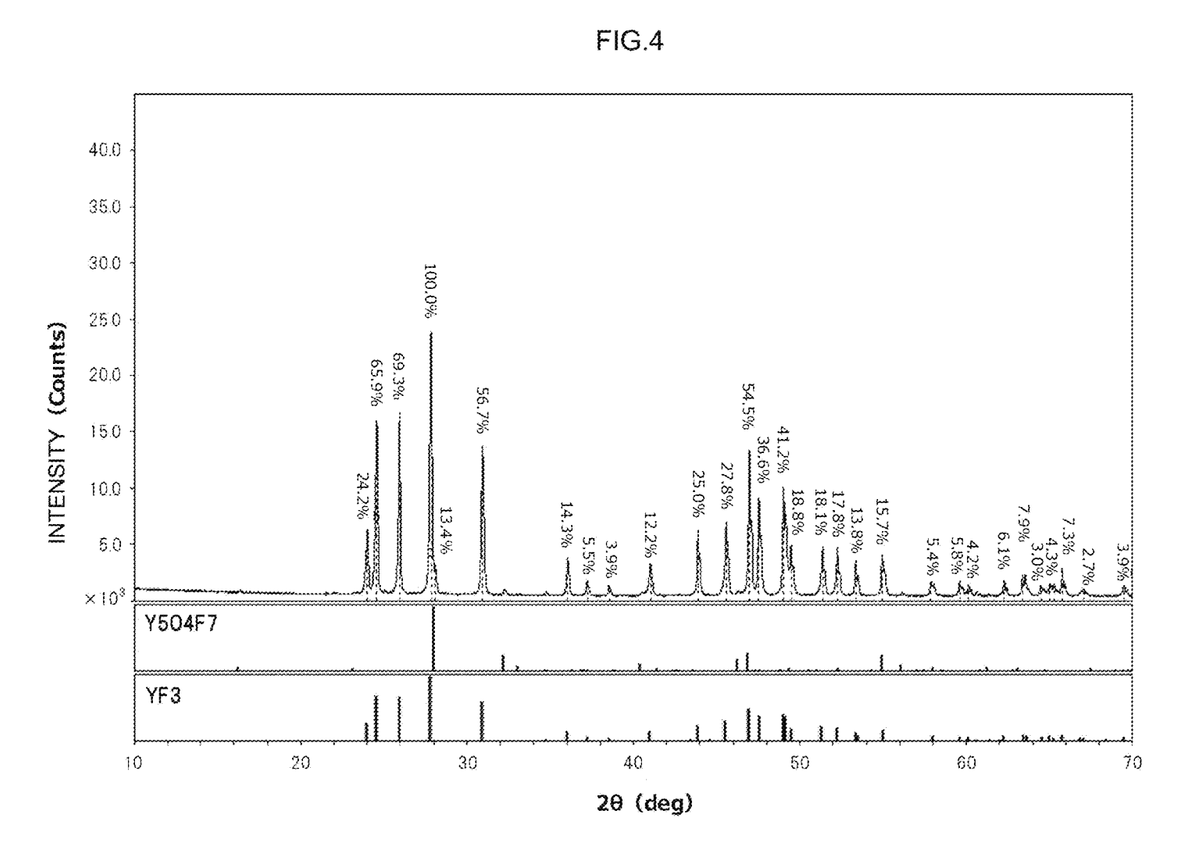
FIG. 4 is an X-Ray diffraction pattern obtained using the thermal spraying material of Example 6, which is a working example.

The composition of each thermal spraying material was investigated by means of X-Ray diffraction analysis. The X-Ray diffraction apparatus was an Ultima IV available from Rigaku Corporation, and measurements were carried out using CuKα radiation as an X-Ray source, an accelerating voltage of 20 kV, an accelerating current of 10 mA, a scanning range 2θ of 10° to 70°, a scanning speed of 10°/min and a sampling width of 0.01°. Here, a divergent slit was 1°, a divergence vertical restriction slit was 10 mm, a scattering slit was ⅙°, a light-receiving slit was 0.15 mm, and the offset angle was 0°. Crystal phases detected in obtained X-Ray diffraction patterns are shown in the "Composition" column for the "Thermal spraying material" in Table 1. For reference purposes, an X-Ray diffraction pattern obtained using the thermal spraying material of Example 6 is shown in FIG. 4.

(Average Particle Diameter)

Average particle diameter was measured using a LA-300 laser diffraction/scattering type particle size distribution measuring device available from Horiba, Ltd. The volume-based $D_{50}$% particle diameter was taken to be the average particle diameter. Obtained average particle diameters are shown in the "$D_{50}$" column for the "Thermal spraying material" in Table 1.

(Compressive Strength)

The compressive strength was taken to be the arithmetic mean of the breaking strength measured for 10 arbitrarily selected composite particles for the thermal spraying material of each example. Breaking strength was measured using a MCT-500 microcompression tester available from Shimadzu Corporation. Breaking strength σ [MPa] was calculated using the following formula: $\sigma = 2.8 \times L/\pi/d^2$, where L [N] denotes the critical load in a compression test and d [mm] denotes the average particle diameter. Obtained compressive strengths are shown in the "Compressive strength" column for the "Thermal spraying material" in Table 1.

(Cumulative Pore Volume)

The cumulative pore volume was taken to be the cumulative pore volume of pores having a pore diameter of 1 μm or less, and was calculated from results obtained by measuring pore distribution characteristics for the thermal spraying material of each example. Pore distribution characteristics were measured in accordance with JIS R 1655:2003 using a mercury intrusion type porosimeter (a Poresizer 9320 available from Shimadzu Corporation). These results are shown in the "Cumulative pore volume" column for the "Thermal spraying material" in Table 1.

(Bulk Density, Tap Density and Bulk Reduction)

The bulk density and tap density of a thermal spraying material were measured, and the bulk reduction was calculated on the basis of these values. The bulk density $D_B$ and tap density $D_T$ were taken to be the initial bulk density and tap density measured using a constant mass measurement method in accordance with JIS R 1628:1997. In addition, the bulk reduction R was calculated from these values using the formula: $R=(D_T-D_B)/D_T \times 100$. These results are shown in the "$D_B$", "$D_T$" and "R" columns for the "Thermal spraying material" in Table 1.

[Production of Thermally Sprayed Coating Film-Equipped Members]

In addition, thermally sprayed coating film-equipped members were obtained by thermally spraying the thermal spraying materials of Examples 1 to 15 onto base materials. Thermal spraying conditions were as described below.

First, a sheet material (measuring 70 mm×50 mm×2.3 mm) comprising an aluminum alloy (Al 6061) was prepared as a base material to be thermally sprayed. The thermal spraying surface of the base material was subjected to a blasting treatment using a brown alumina grinding material (A #40). Thermal spraying was carried out by means of an atmospheric plasma spraying method using a commercially available plasma spraying apparatus (SG-100 available from Praxair Surface Technologies, Inc.). Plasma was generated at a voltage of 37.0 V and a current of 900 A using argon gas at 50 psi (0.34 MPa) and helium gas at 50 psi (0.34 MPa) as plasma working gases. A thermally sprayed coating film having a thickness of 200 μm was formed by supplying the thermal spraying material to the thermal spraying apparatus at a speed of 20 g/min using a powder supply machine (Model 1264 available from Praxair Surface Technologies, Inc.). Moreover, the movement speed of the thermal spraying gun was 24 m/min, and the spraying distance was 90 mm.

The thermally sprayed coating films of the thermally sprayed coating film-equipped members obtained in Examples 1 to 15 were investigated in terms of film formation rate, porosity and erosion rate ratio, as shown below, and these results are shown in Table 1.

(Film Formation Rate)

When thermally sprayed coating films were formed using the thermal spraying materials, the rate at which the thickness of the thermally sprayed coating film increased per unit time was calculated as the film formation rate. The increase in thickness of the thermally sprayed coating film was determined by masking a part of the base material, carrying out thermal spraying for a prescribed period of time, and measuring the height of a step, which was determined by measuring the height of a step between a thermally sprayed portion and a masked portion, using a surface roughness measuring device (SV-3000CNC available from Mitutoyo Corporation). The film formation rate was then calculated by dividing the measured step height by the thermal spraying time. These results are shown in the "Film formation rate" column for the "Thermally sprayed coating film" in Table 1.

(Porosity)

Porosity was calculated from the areal proportion of pores in a cross section of a thermally sprayed coating film. First, a thermally sprayed coating film-equipped member was cut along a surface perpendicular to the surface of the base material, the obtained cross section was resin-filled and polished, and an image of the cross section was then taken using a digital microscope (VC-7700 available from Omron Corporation). The area of pore portions in this cross section image was determined by analyzing the image using image analysis software (Image Pro available from Nippon Roper K.K.), and the proportion of the area of these pore portions relative to the overall cross section was calculated. These results are shown in the "Porosity" column for the "Thermally sprayed coating film" in Table 1.

(Erosion Rate Ratio)

The thermally sprayed coating films were subjected to plasma exposure tests in the following way. First, a test piece was prepared by forming a thermally sprayed coating film having a thickness of 200 μm and dimensions of 20 mm×20 mm on a base material under the thermal spraying conditions described above, mirror polishing the surface of the thermally sprayed coating film to a coating film thickness of 100 μm, and masking the four corners of the thermally sprayed coating film with masking tape. This test piece was then placed on a silicon wafer having a diameter of 300 mm, which was disposed on a stage in a chamber of a parallel plate type semiconductor device production apparatus (NLD-800 available from ULVAC, Inc.). Next, the central part of the silicon wafer and thermally sprayed coating film was etched by repeatedly generating fluorine gas plasma (F-based plasma) or chlorine gas plasma (Cl-based plasma) using a prescribed cycle under the conditions shown in Table 2 below. Moreover, F-based plasma was generated using a mixed gas of $CF_4$ and $O_2$ (volume ratio: 53.2/5) as an etching gas, as shown in Table 2 below. In addition, Cl-based plasma was generated using a mixed gas of $CCl_4$ and $O_2$ (volume ratio: 53.2/5) as an etching gas. The plasma exposure time was approximately 0.9 hours, including intervals (cooling cycle times). Next, the reduction in thickness of the thermally sprayed coating film by the plasma was measured so as to determine the etching amount (erosion amount), and the plasma erosion rate was calculated as the erosion amount per unit time. The reduction in thickness of the thermally sprayed coating film was determined by measuring the height of a step between the masked portion and the plasma-exposed surface using a surface roughness measuring device (SV-3000CNC available from Mitutoyo Corporation). If the plasma erosion rate of the thermally sprayed coating film of Example 14 is taken to be a standard value of "1", the plasma erosion rate ratio is determined by calculating the plasma erosion rate (relative value) of a thermally sprayed coating film on the basis of the following formula: (plasma erosion rate of thermally sprayed coating film of Example 14 [μm/hr])÷(plasma erosion rate of thermally sprayed coating film of example in question [μm/hr]). Moreover, the thermally sprayed coating film of Example 14, which is used as a standard, was formed using a thermal spraying material obtained by firing a publicly known granular powder in an atmospheric atmosphere at a temperature of 900° C. These results are shown in the "Plasma erosion rate ratio" column for the "Thermally sprayed coating film" in Table 1.

TABLE 1

| | | | Thermal spraying material | | | | | | | | Thermally sprayed coating film | | |
|---|---|---|---|---|---|---|---|---|---|---|---|---|---|
| | | | Raw material powder | | | | Compressive strength (MPa) | Cumulative Pore volume (cm³/g) | $D_B$ (g/cm³) | $D_T$ (g/cm³) | R (%) | Film formation rate (mm/min) | Porosity (%) | Erosion rate ratio |
| No. | Firing atmosphere | Firing temperature (° C.) | Composition | $D_{50}$ (mm) | Composition | $D_{50}$ (mm) | | | | | | | | |
| 1 | Ar | 700 | YF₃ | 3 | YF₃ | 35 | 4.2 | 0.234 | 0.96 | 1.35 | 28.9 | 13 | 4 | 0.95 |
| 2 | Ar | 900 | YF₃ | 0.1 | YF₃ | 35 | 11.2 | 0.116 | 1.48 | 2.25 | 34.2 | 20 | 1 | 0.85 |
| 3 | Ar | 900 | YF₃ | 3 | YF₃ | 45 | 7.8 | 0.156 | 1.28 | 2.09 | 38.8 | 20 | 3 | 0.91 |
| 4 | Ar | 900 | YF₃ | 5 | YF₃ | 40 | 5.6 | 0.197 | 1 | 1.56 | 35.9 | 20 | 3 | 0.92 |
| 5 | Ar | 1000 | YF₃ | 0.1 | YF₃ | 30 | 50.4 | 0.014 | 1.62 | 2.69 | 39.8 | 20 | 1 | 0.85 |
| 6 | Ar | 1100 | YF₃ | 5 | YF₃ | 40 | 34.1 | 0.027 | 1.16 | 1.73 | 32.9 | 20 | 3 | 0.88 |
| 7 | N₂ | 1100 | YF₃ | 3 | YF₃ | 40 | 43.8 | 0.096 | 1.23 | 1.99 | 38.2 | 20 | 2 | 0.9 |
| 8 | Vacuum | 1100 | YF₃ | 3 | YF₃ | 40 | 39.4 | 0.083 | 1.12 | 1.75 | 36 | 20 | 2 | 0.9 |
| 9 | Vacuum | 400 | YF₃ | 3 | YF₃ | 50 | 0.3 | 0.324 | 0.93 | 1.15 | 19.1 | 10 | 9 | 1 |
| 10 | Vacuum | 400 | YF₃ | 30 | YF₃ | 40 | 0.3 | 0.348 | 1.13 | 1.76 | 35.8 | 10 | 9 | 1 |
| 11 | Air | 500 | YF₃ | 3 | YF₃ | 45 | 0.5 | 0.284 | 0.96 | 1.22 | 21.3 | 10 | 5 | 0.98 |
| 12 | Atmospheric | 100 | YF₃ | 5 | YF₃ | 40 | 0.1 | 0.553 | 1.3 | 1.73 | 24.9 | 10 | 6 | 0.98 |
| 13 | Atmospheric | 800 | YF₃ | 3 | YF₃ + YOF | 50 | 0.7 | 0.259 | 1.7 | 2.41 | 29.5 | 10 | 8 | 0.96 |
| 14 | Atmospheric | 900 | YF₃ | 3 | YF₃ + YOF | 40 | 1.5 | 0.267 | 1.7 | 2.37 | 28.3 | 10 | 10 | 1 |
| 15 | Atmospheric | 1000 | YF₃ | 0.1 | YF₃ + YOF | 40 | 2.4 | 0.216 | 1.8 | 2.39 | 24.7 | 10 | 15 | 1.1 |

TABLE 2

| Plasma generation conditions | F type plasma | Cl type plasma |
|---|---|---|
| Etching gas composition | CF₄/O₂ | CCl₄/O₂ |
| Gas flow rate (sccm) | 53.2/5 | 53.2/5 |
| Chamber pressure (Pa) | 1 | 1 |
| Plasma generation power (Top) (W) | 1500 | 1500 |
| Plasma generation power (Bottom) (W) | 400 | 400 |
| Bias area (mm*) | 100 (4") | 100 (4") |
| Power density (W/cm²) | 5.1 | 5.1 |
| Exposure time (hrs) | 0.9 | 0.9 |
| Exposure/cooling cycle (min) | 0.5/1.5 | 0.5/1.5 |

(Firing in Non-Oxidizing Atmosphere; Examples 1 to 10)

As is clear from the thermal spraying material composition column for Examples 1 to 10 in Table 1, if granulated powders were fired in noble gas atmospheres, inert atmospheres and vacuum atmospheres, which are non-oxidizing atmospheres, it was understood that it was possible to obtain thermal spraying materials in which the yttrium fluoride composition was maintained. Moreover, as shown in FIG. 4, an extremely small amount of an yttrium oxyfluoride ($Y_5O_4F_7$) was detected, along with yttrium fluoride ($YF_3$), in an XRD pattern of the thermal spraying material of Example 6, for example. However, the proportion of the yttrium oxyfluoride was less than 0.5 mol % of the overall thermal spraying material, and it is thought that a thermal spraying material comprising substantially yttrium fluoride was obtained. Here, sintering of yttrium fluoride microparticles progresses at a temperature of approximately 900° C. or higher, and sintering is difficult at a firing temperature of, for example, 800° C. or lower. It was understood from this that the compressive strength of an obtained thermal spraying material was 5 MPa or more in Examples 2 to 8, in which the firing temperature was 900° C. or higher, but less than 5 MPa for the thermal spraying materials of Examples 1, 9 and 10, in which the firing temperature was 700° C. or 400° C. In addition, it was confirmed that in the thermal spraying materials of Examples 2 to 8, the compressive strength significantly increased as the firing temperature increased.

Moreover, FIG. 1 is a SEM image showing the structure of a composite particle in the thermal spraying material of Example 3. It is understood from FIG. 1 that yttrium fluoride microparticles in Example 3 all have a rounded shape, form a neck, and are mutually integrated at a relatively large interface. Despite being clearly grasped by comparing with composite particles of the thermal spraying material of Example 12 below, it was understood that yttrium fluoride microparticles were formed as a result of the raw material powder undergoing grain growth and becoming coarser. In addition, although pores were observed between yttrium fluoride microparticles, it was understood that approximately spherical composite particles were formed on the whole. FIG. 2 is a SEM image showing the structure of a composite particle in the thermal spraying material of Example 5. The thermal spraying material of Example 5 was fired at a higher temperature using a finer raw material powder compared to the thermal spraying material of Example 3. That is, sintering had progressed further in this thermal spraying material. Therefore, it is understood that in the yttrium fluoride microparticles in Example 5, particles of the raw material powder underwent significant grain growth and became coarser, and that these particles were bound to and integrated with each other at a large interface, thereby forming dense composite particles having a smoother surface than the composite particles of Example 3. As a result, it can be seen that the number of pores in gaps between yttrium fluoride microparticles that constitute the composite particles was reduced and the composite particles became compact. Therefore, it can be understood that the compressive strength of the composite particles increases if sintering progresses as a result of the firing temperature increasing. That is, it was understood that a good sintered state can be grasped from the compressive strength.

This can also be confirmed from the cumulative pore volume results shown in Table 1. For example, a rough correlation can be seen between the compressive strength and the cumulative pore volume of the composite particles, and it can be understood that cumulative pore volume decreases as compressive strength increases. In addition, from a comparison of Examples 2 to 4, it can be understood that as a finer powder is used as a raw material powder, composite particles become more compact as a result of granulation and sintering, meaning that composite particles having high compressive strength are obtained. Despite not being a direct comparison, it can be understood by comparing Examples 1, 2 and 8, comparing Examples 2 and 5 or comparing Examples 4 and 6 that as the firing temperature increases, the composite particles become more compact, meaning that composite particles having high compressive strength are obtained.

In addition, the thermal spraying materials of Examples 2 to 8, in which sintering had progressed, had high bulk reduction values of 30% or more, whereas the thermal spraying materials of Examples 1 and 9, in which sintering did not progress, had relatively low bulk reduction values. This is thought to be due to the following reason. The surface state of the granulated powder tends to be uneven while in a granulated state, and it is difficult for the granulated powder to be densely packed by free falling. In addition, even in cases where an impact is applied by tapping, it is difficult to increase the degree of packing due to the surface unevenness. However, in thermal spraying materials in which sintering has progressed, raw material particles undergo spheroidization during sintering, raw material particles undergo further sintering and integration, and surface unevenness is alleviated. As a result, it is thought that the bulk density tends to increase and the bulk reduction increases as a result of tapping. As a result, the thermal spraying materials of Examples 4 to 8 exhibit high fluidity, increased supply properties and a higher film formation rate. Moreover, in the case of the thermal spraying material of Example 10, the raw material powder had a large particle diameter, granulated particles having a distorted aspherical shape were formed, and a greatly reduced initial bulk density was measured. As a result, it is thought that the bulk reduction increased, and it was thought that the reason for the bulk reduction exceeding 30% was different from that for Examples 2 to 8.

The thermal spraying materials of Examples 2 to 8 exhibited high composite particle compressive strengths and high bulk reduction values of 30% or more. As a result, it was confirmed that these thermal spraying materials exhibited high fluidity and high film formation rates. Furthermore, in cases where the thermal spraying materials of Examples 2 to 8, which had high film formation rates, were used, it was understood that because the thermal spraying materials were supplied smoothly to base materials, it was possible to form a good thermally sprayed coating film having a low porosity and the erosion rate ratio of the thermally sprayed coating film was kept low.

However, in cases where the thermal spraying materials of Examples 1, 9 and 10, in which sintering did not progress and the film formation rate was low, were used, it was understood that a highly porous thermally sprayed coating film was formed and the erosion rate ratio of the thermally sprayed coating film also increased. Moreover, it is thought that sintering progressed further in the thermal spraying material of Example 1, in which the firing temperature was 700° C., than in the thermal spraying materials of Examples 9 and 10, in which the firing temperature was 400° C. to 500° C., and it was understood that as a result, the thermal spraying material of Example 1 exhibited a good bulk reduction, film formation rate, porosity and erosion rate ratio, although not as good as Examples 2 to 8. Moreover, it is understood from the results of Examples 6 to 8 etc. that a non-oxidizing atmosphere may be any of a noble gas atmosphere, an inert atmosphere or a vacuum atmosphere. (Firing in Oxidizing Atmosphere; Examples 11 to 15)

Meanwhile, in Examples 11 to 15, in which granulated powders were fired in an atmospheric atmosphere, it was understood that if the firing temperature was close to the drying temperature of 100° C., it was possible to obtain a thermal spraying material in which the yttrium fluoride composition of the raw material powder was maintained (Example 12). FIG. 3 is a SEM image showing the structure of a composite particle in the thermal spraying material of Example 12. Composite particles in Example 12 are granulated particles which have an average particle diameter of 40 µm and are granulated using a raw material powder having an average particle diameter of 5 µm, and particles of the raw material powder are bound to each other by means of a resin binder without being sintered or undergoing grain growth. In addition, it is understood that individual particles have a sharp-cornered shape derived from an orthorhombic crystal structure. In addition, it was understood that it was possible to obtain a thermal spraying material in which the yttrium fluoride composition of the raw material powder was maintained if the firing temperature was 500° C. and conditions were used in which firing did not progress and compressive strength was low (Example 11). However, it was understood that if the firing temperature was 800° C. or higher, yttrium fluoride was oxidized and yttrium oxyfluoride (YOF) was formed in the thermal spraying material (Examples 13 to 15). Although not shown in the tables, it was confirmed from XRD results that the proportion of YOF increased as the firing temperature in air increased.

Moreover, in the thermal spraying material of Example 12, which was obtained by firing in an atmospheric atmosphere at 100° C., and the thermal spraying material of Example 11, which was obtained by firing in air at 500° C., the granulated powder was dried or heat treated, and sintering did not progress. Therefore, these thermal spraying materials had low compressive strength values of 0.1 to 0.5 MPa. Conversely, in the thermal spraying materials of Examples 13 to 15, which were obtained by firing in an atmospheric atmosphere at 800° C. or higher, sintering of the granulated powder progressed as the firing temperature increased, and it was understood that the compressive strength increased to 0.7 to 2.4 MPa as the firing temperature increased. However, it was understood that in these thermal spraying materials, the compressive strength was a not particularly high value of 2.4 MPa or less despite firing being carried out at a relatively high temperature of 800° C. or higher. This is thought to be because fluorine volatilized as $YF_3$ underwent oxidative decomposition into YOF during firing and pores were formed as fluorine discharge paths in the material.

This can also be confirmed from the cumulative pore volume results shown in Table 1. For example, in the thermal spraying materials of Examples 11 and 12, in which sintering did not progress, the cumulative pore volume was high because many voids were formed between yttrium fluoride microparticles. However, the cumulative pore volume decreased as the firing temperature increased and sintering progressed, as shown by Examples 13 to 15. However, compaction of composite particles was suppressed by volatilization of fluorine during firing in Examples 13 to 15, as mentioned above, and it was understood that the cumulative pore volume was higher in Examples 2 to 8 etc.

In addition, it was understood that when thermal spraying is carried out using the thermal spraying material of Example 12, because this thermal spraying material has an extremely low compressive strength, the granulated powder disintegrates during the thermal spraying and the film formation rate is low. In addition, it was understood that the formed thermally sprayed coating film had a relatively high porosity of 6%, meaning that the thermally sprayed coating film had a relatively high erosion rate ratio of 0.98. In cases where thermal spraying was carried out using the thermal spraying materials of Examples 13 to 15, film formation rates were low. In addition, in cases where the thermal spraying materials of Examples 13 to 15 were used, it was confirmed that thermally sprayed coating films tended to have high porosity values of 8% to 15% in all of these examples, and that the porosity and erosion rate ratio increased as the firing temperature increased. Although details for this are not clear, it is surmised that as firing is carried out at a high temperature in an atmospheric atmosphere, yttrium fluoride in the thermal spraying material is oxidized, meaning that yttrium oxide is formed at a high proportion in the thermally sprayed coating film also.

Therefore, by using a thermal spraying material that has been fired in an atmospheric atmosphere, oxidation of the thermal spraying material tends to progress during thermal spraying. Therefore, it was understood that fluorine volatilizes during film formation, which leads to the porosity of the formed thermally sprayed coating film being significantly increased to 8% to 15%. In addition, it was understood that as the porosity of a thermally sprayed coating film increases, the erosion rate ratio increases and the plasma erosion resistance decreases. It can be confirmed from this that by using a thermal spraying material obtained by being sintered in a non-oxidizing atmosphere, it is possible to form a thermally sprayed coating film having improved plasma erosion resistance.

Specific examples of the present invention have been explained in detail above, but these are merely examples, and do not limit the scope of the invention. The features described in the claims can include aspects obtained by variously modifying or altering the specific examples shown above.

The invention claimed is:

1. A thermal spraying material comprising:
granulated sintered composite particles in which a plurality of sintered yttrium fluoride microparticles are integrated with each other directly,
wherein the granulated sintered composite particles have a compressive strength of 5 MPa or more.

2. The thermal spraying material according to claim 1, wherein the thermal spraying material is a powder comprising a plurality of the composite particles, and the powder has a bulk density of 1 to 1.7 g/cm$^3$.

3. The thermal spraying material according to claim 1, wherein the thermal spraying material is a powder comprising a plurality of the composite particles, and the powder has an average particle diameter of 10 to 100 μm.

4. The thermal spraying material according to claim 1, wherein no diffraction peak attributable to yttrium oxide is detected in X-Ray diffraction analysis of the powder.

5. The thermal spraying material according to claim 1, wherein a bulk reduction R (%), as calculated on the basis of the following formula: $R=(D_T-D_B)/D_T \times 100$; is 30 or more, wherein $D_T$ is a tap density of the powder and DB is a bulk density of the powder.

6. The thermal spraying material according to claim 1, wherein in an electron microscope observation of the composite particles, 40% by number or more of the yttrium fluoride microparticles are bound to and integrated with each other.

7. The thermal spraying material according to claim 1, wherein a cumulative pore volume of pores having a pore diameter of 1 μm or less, as determined by means of mercury intrusion porosimetry, is 0.2 cm$^3$/g or less.

* * * * *